July 18, 1944.  R. WOOTEN  2,354,167
SHOVEL SHIFTING TOOL FOR LOADING MACHINES
Filed Feb. 21, 1944
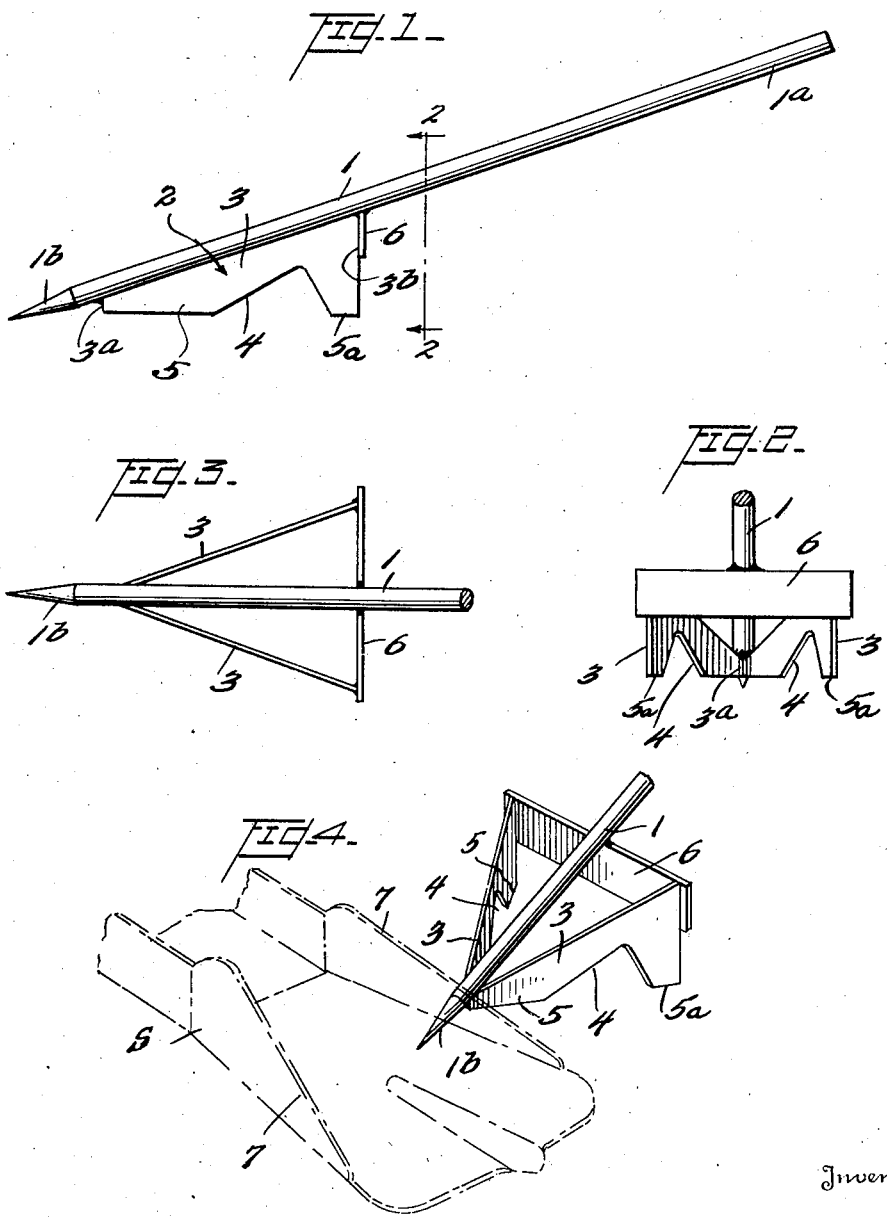
Inventor
Ralph Wooten,
By Eugene H. Vunz
his Attorney Patented July 18, 1944

2,354,167

UNITED STATES PATENT OFFICE 2,354,167

SHOVEL SHIFTING TOOL FOR LOADING MACHINES

Ralph Wooten, Roundup, Mont.

Application February 21, 1944, Serial No. 523,305

1 Claim. (Cl. 254—88)

This invention relates to loading machines of the shaker-conveyor type, and more especially to tools for use in connection with such machines.

In loading machines of a type which is commonly employed in mines for loading coal onto shaker-conveyor trough lines from the rooms or entries, the longitudinally reciprocating shovel at the forward end of the machine, in addition to being extensible and retractible, is usually swively mounted so as to be moved to different positions for picking up coal from various locations within a wide room, or from breakthroughs or entries, at an angle to the trough line. One such type of loading machine is disclosed in Patent No. 2,265,519 of Loyal F. Crawford, dated December 9, 1941.

While it is not unusual to provide drum and cable connections to swing the shovel laterally, ordinarily it is the practice for the machine operator to laboriously pry the shovel sidewise by means of a crow-bar engaged under its side. Thus, the shovel is shifted little-by-little from its original position into its new position of adjustment.

It is an important object of my invention to eliminate this strenuous and irksome work on the part of the loading machine operator by providing a tool adapted to be manually positioned relative to an inclined side of the reciprocating shovel so as to cause the shovel to be shifted sidewise under its own power.

A further object of my invention is to provide a tool of the above character which is so constructed and arranged as to be readily engaged with the side of the shovel and present a sloping surface adapted to exert a side thrust upon the shovel to displace it laterally.

Still another object of my invention is to provide a tool of the above character which is of light and sturdy construction and having means for frictionally engaging the ground to prevent it from slipping when in service.

Other objects and advantages will be apparent from the following detailed description of a preferred embodiment of the invention, reference being had to the annexed drawing, in which:

Figure 1 is a view in side elevation of a shovel shifting tool for loading machines;

Figure 2 is a rear view, in part sectional, of the shifting tool of Fig. 1;

Figure 3 is a plan view; and

Figure 4 is a perspective view of the tool, showing the manner in which it is adapted to be applied to a reciprocating shovel for moving the latter sidewise.

The shovel shifting tool illustrated in the drawing comprises a relatively long metal bar 1 having a handle portion 1a at one end and a pointed ground-engaging portion 1b at its other end.

Secured to the lower end of the bar is a triangular-shaped metal frame 2 having side plates 3 which converge to meet along a line 3a located a short distance inwardly from the pointed end of the bar. The front edges 3a of the side plates are substantially shorter than their rear edges 3b, thereby imparting to the plane of the top of the frame a slope of approximately 30 degrees. The side plates correspond in outline, each being formed with a cutaway portion 4 so that the side plates together form a V-shaped toe portion 5 at the forward end of the frame designed to rest upon the ground and a pair of spurs 5a at the rear of the frame adapted to press into the ground when the tool is under load and prevent it from slipping.

A cross-plate 6 of less vertical width than the rear edges 3b of the side plates extends between the spaced-apart rear edges of these side plates to complete the triangle and strengthen the structure. The bar 1 extends across the frame in bisecting relation thereto so as to overlie the side plates at their point of convergence and so as to overlie the cross-plate 6 at a point midway of its length. The bar 1, side plates 3 and cross-plate 6 are preferably all secured together by welding so as to provide a rigid structure of comparatively light weight. Because the bar 1 lies in or parallel to the plane of the top of the frame, it will be disposed at an inclination of approximately 30 degrees to the horizontal when the tool is resting upon the ground. This angle of slope is subject to variation within reasonable limits.

The manner of using my tool is illustrated in Fig. 4. As is customary in loading machines of the shaker-conveyor type, the reciprocating shovel S, indicated in phantom lines, is outwardly flared so as to provide longitudinally and outwardly inclined side walls 7. When the shovel is to be shifted to a new position, the wedge-shaped end of the tool is shoved against a side wall of the shovel during its outward stroke, so that in its ensuing inward stroke the side of the shovel rides up along the inclined lower end of the bar and is automatically urged sidewise about its swivel connection (not shown) with the loading machine. The flared end of the shovel acting against the sloping surface of the tool thus exerts a camming action to slide the shovel sidewise.

By successively repeating this operation the shovel is, by increments, worked over into its new location ready to perform its loading function. Except for repeatedly changing the position of the tool, no effort is called for on the part of the operator in charge of the machine. Because of the pointed end *1b* of the bar and the ground-engaging spurs *5a* at the rear of the frame, the tool is prevented from slipping under the reaction pressure exerted by the shovel.

Obviously various changes in the form, construction, arrangement and combination of the several parts of my new shovel shifting tool may be made and substituted for those herein shown and described without departing from the nature and principle of my invention as defined by the following claim.

I claim:

A shovel shifting tool for use in connection with loading machines of the shaker-conveyor type, said tool comprising an elongated bar and a ground-engaging frame attached to the lower end of said bar for supporting said bar at a substantial angle to the horizontal, said frame comprising a pair of convergent side plates and a cross-plate arranged in the form of a triangle, the side plates being substantially shorter along their forward edges than along their rear edges and being cutaway so as together provide a V-shaped ground-engaging toe and a pair of spurs for engaging the ground to prevent slippage.

RALPH WOOTEN.